C. KULA.
DEMOUNTABLE RIM FASTENING FOR VEHICLE WHEELS.
APPLICATION FILED MAY 14, 1912.

1,111,523.

Patented Sept. 22, 1914.

WITNESSES:
Christine A. Brandel.
Roy Wallis

INVENTOR.
Charles Kula,
BY
Geo. B. Willcox, ATTORNEY.

UNITED STATES PATENT OFFICE.

CHARLES KULA, OF BAY CITY, MICHIGAN.

DEMOUNTABLE-RIM FASTENING FOR VEHICLE-WHEELS.

1,111,523.   Specification of Letters Patent.   Patented Sept. 22, 1914.

Application filed May 14, 1912.   Serial No. 697,166.

*To all whom it may concern:*

Be it known that I, CHARLES KULA, a citizen of the United States, residing at Bay City, in the county of Bay and State of Michigan, have invented certain new and useful Improvements in Demountable-Rim Fastenings for Vehicle-Wheels; and I do hereby declare the following to be a full, clear, and exact description of the invention, such as will enable others skilled in the art to which it appertains to make and use the same.

This invention relates to tires for vehicle wheels and pertains more particularly to means for easily and quickly attaching and detaching demountable rims applied to vehicle wheels.

While the invention may be applied to various classes of vehicle wheels, it pertains more especially to automobile wheels having tires carried by demountable rims so that the inflated tire and rim in which it is carried may be quickly removed from or attached to the wheel.

Heretofore demountable rims have been employed in which the fastening means, whereby the rim is secured to the felly band of the wheel, have consisted in numerous parts, such as bolts, screws, and nuts, each wheel being usually equipped with a considerable number of such clamping devices. In making repairs on the road, automobile drivers have experienced great inconvenience from the use of such devices, owing to the fact that a large number of separate pieces must be detached from the wheel before the demountable rim can be removed, and these pieces must all be replaced when a new rim is mounted.

The objects of my invention are, first, to provide a simple device by which a demountable rim may be easily and quickly attached to or removed from the wheel, without the necessity of detaching any of the clamping devices from the wheel.

A further object is to provide a clamping device that shall be capable of engaging a considerable portion of the inner periphery of the demountable rim, and of being withdrawn from the rim far enough to completely release that part of the rim which is normally engaged by the clamping device, the purpose of this feature of my invention being to release a sufficient length of the periphery of the wheel from engagement with the rim, to enable the rim to be easily removed.

With these and certain other objects in view which will appear later in the specification, my invention consists in the devices described and claimed and the equivalents thereof.

Figure 1:
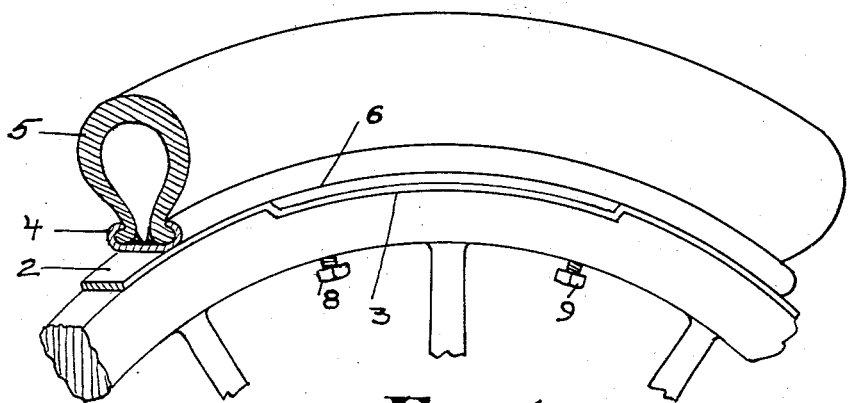
Figure 2:
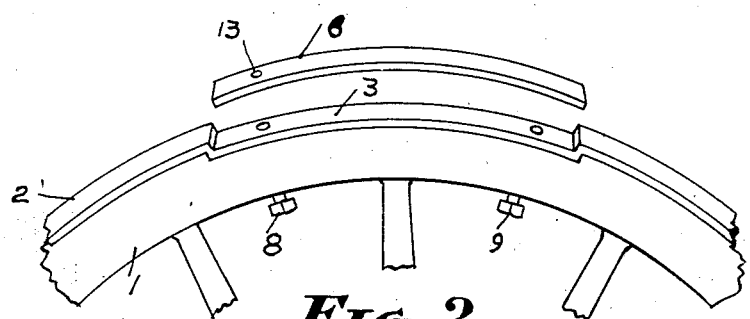
Figure 3:
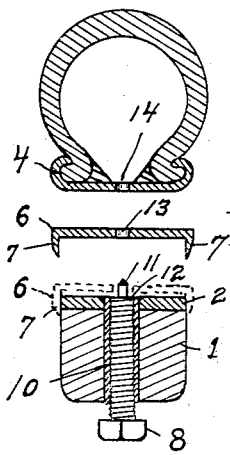
Figure 4:
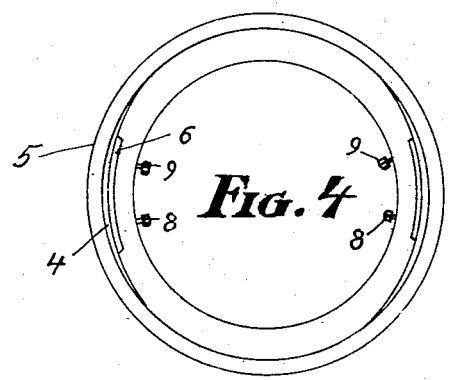

In the drawings, Figure 1 is a view broken away in part, showing a tire to which my improvement is applied; Fig. 2 is a similar view of the felly and the clamping device; Fig. 3 shows the manner of assembling the felly band, clamping device, and the demountable rim, the parts being shown in cross-section and detached; and Fig. 4 is a diagrammatic view showing in an exaggerated manner for purpose of better illustration, the relative shape of the demountable rim and the felly of the wheel before the rim is engaged by the clamping devices.

1 represents the felly which is of usual construction. 2 is the felly band which is also of ordinary construction except at certain parts of the periphery of the wheel where it is depressed into an elongated notch formed in the felly.

The demountable rim 4 carrying a pneumatic casing 5, both of which may be of any desired construction, is slipped over the felly band 2, as shown in Fig. 1.

In carrying out my invention I apply a clamping member 6 in the depression 3. This clamping member is preferably formed of a curved strip of metal having downwardly projecting flanges 7 to take over the lateral edges of the felly band 2, as indicated by dotted lines in Fig. 3. The clamping member 6 is preferably equal in length to the length of the depression 3 in band 2, and is removably fitted in the depression, as shown in Figs. 1 and 2. The outer face of member 6 is curved to conform to the shape of the band 2, but is preferably of slightly less radius than the other portions of the band 2, as indicated in Fig. 4, so that when pressed tightly against the depressed face of band 2, the clamping member 6 will be out of contact with the inner face of the demountable rim 4. This is indicated in a very exaggerated manner in Fig. 4, it being understood that in practice the actual clearance may be imperceptible, there merely being sufficient clearance required to avoid the frictional contact between the clamping member and the demountable rim.

Near the ends of the clamping member 6 I mount adjusting screws 8 and 9, each screw being threaded to an internally threaded bushing 10, the upper end of which is fixed in the band 2, as shown in Fig. 3, one of the screws as 8 is formed with a projecting pin 11 and a shoulder 12, and the corresponding end of clamping member 6 is formed with a hole 13 to receive the pin 11. The corresponding point of the demountable rim is also formed with a recess 14. The other adjusting screw 9 need not be provided with a pin 11.

The device is assembled by partly withdrawing screw 8, placing clamping member 6 in the depression 3 of band 2 with its flanges 7 overlapping the edges of the band, and the pin 11 projecting through the opening 13. The demountable rim 4 with its casing is then slipped over the band 2 in the usual manner, as indicated in Fig. 4. Screws 8 and 9 are then tightened, forcing member 6 outwardly until it engages the rim. The tip of pin 11 enters the recess 14 in the rim and prevents its movement on the band, either circumferentially or sidewise, and insures its proper placing while the clamping members are being tightened.

The recess 14 may extend clear through the clamping member as shown in Fig. 3, or only part way, if desired, it being only necessary that the recess be such as to receive the end of pin 11 to lock the demountable rim against lateral movement.

Referring to Fig. 4, it will be seen that since the clamping members are practically out of contact with the demountable rim when the screws 8 and 9 are loosened, the rim 4 may be easily removed. In practice I prefer to make the clamping member 6 of considerable length as it thereby releases a larger portion of the rim and enables the rim to be removed very easily.

By the means above described I have produced a device for clamping demountable rims, that is simple in construction and has but few parts, none of which need necessarily be removed from the wheel when a demountable rim is being attached or detached.

Having described my invention, what I claim and desire to secure by Letters Patent, is:—

The combination of a felly and a felly band secured thereon, said band formed with circumferentially depressed portions, and a demountable rim carrying a casing; of a removable clamping member having a hole near one end, inwardly projecting flanges formed integral with said clamping member adapted to take over and cover the sides of the depressed portion of said band, a pair of adjusting screws each located near one end of said clamping member and threaded through said felly and said band, one of said screws formed with a projecting pin adapted to pass through the hole in said clamping member and engage and lock said demountable rim; a shoulder on said screw adapted to engage the inner face of said clamping member, said clamping member being normally out of engagement with said rim when the screws are loosened.

In testimony whereof, I affix my signature in presence of two witnesses.

CHARLES KULA.

Witnesses:
 FRANK CASPER,
 AUGUSTUS ELIAS.